A filter assembly with a frame and a filter element including a sheet of filter media with attachment strips at opposite ends. The frame positions the filter element with the filter media across a passageway in the frame and with the attachment strips along opposite end parts of a perimeter portion of the frame. Abutments extend along the perimeter portion between its end parts and along opposite edges of the filter material. Projections on the end parts are engaged in openings in the attachment strips and are spaced from the abutments such that the filter element can be mounted on the frame with either of the attachment strips engaged with the projections at either of the end parts while the filter element can only be mounted on the frame with an inlet surface of the sheet of filter material facing the same direction as a front surface of the frame.

(12) United States Patent
Kubokawa (10) Patent No.: US 6,843,820 B2
(45) Date of Patent: Jan. 18, 2005

(54) FILTER ASSEMBLY (75) Inventor: James O. Kubokawa, Saint Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 85 days.

(21) Appl. No.: 10/379,069

(22) Filed: Mar. 4, 2003

(65) Prior Publication Data
US 2004/0172928 A1 Sep. 9, 2004

(51) Int. Cl.[7] ............................................. B01D 46/10
(52) U.S. Cl. ............................ 55/495; 55/497; 55/499; 55/500; 55/501; 55/503; 55/521; 55/DIG. 31
(58) Field of Search .......................... 55/495, 497, 499, 55/500, 501, 503, 521, DIG. 31

(56) References Cited

U.S. PATENT DOCUMENTS

| 3,280,984 A | 10/1966 | Sexton et al. | |
| 3,774,377 A | 11/1973 | Bishop | |
| 3,789,589 A * | 2/1974 | Delany et al. | 55/500 |
| 4,042,358 A | 8/1977 | Frohmader | |
| 4,334,899 A * | 6/1982 | McConnell | 55/501 |
| 5,114,448 A * | 5/1992 | Bartilson | 55/497 |
| 5,332,409 A * | 7/1994 | Dralle | 55/501 |
| 5,792,242 A | 8/1998 | Haskett | |
| 5,840,094 A | 11/1998 | Osendorf et al. | |
| 5,935,282 A * | 8/1999 | Lin | 55/495 |
| 6,033,453 A | 3/2000 | Weddell, III | |
| 2003/0230062 A1 * | 12/2003 | Kubokawa et al. | 55/497 |
| 2003/0230063 A1 * | 12/2003 | Kubokawa et al. | 55/497 |

FOREIGN PATENT DOCUMENTS

| JP | Hei 11-351657 | 12/1999 | |
| JP | 11-351657 | * 12/1999 | F24F/13/28 |

OTHER PUBLICATIONS

U.S. Appl. No. 10/172,575, filed Jun. 14, 2002, Filter Assembly.

* cited by examiner

Primary Examiner—Duane Smith
Assistant Examiner—Jason M. Greene
(74) Attorney, Agent, or Firm—William L. Huebsch (57) ABSTRACT 16 Claims, 5 Drawing Sheets

FILTER ASSEMBLY

FIELD OF THE INVENTION

The present invention generally relates to filter assemblies and, more particularly, to air filter assemblies that include reusable frames and replaceable filter material.

BACKGROUND OF THE INVENTION

Many conventional residential heating and cooling systems include a disposable air filter assembly which includes a frame, a sheet of flexible filter material, and a filter material support structure such as a mesh screen that supports the filter material within the frame. When such a filter becomes dirty or clogged, the entire filter (including the frame and support structure) is discarded, even though only the filter material is no longer functional. This is wasteful and adds cost to such filters. Also, because such filters are rather bulky, they are often purchased as needed rather than being stored for future use. Thus, changing a filter can require purchasing a new filter which is not always convenient so that filter replacement can be delayed resulting in reduced efficiency of the system.

One solution to these problems has been to provide filter assemblies that include reusable frames and replaceable filter media. U.S. Pat. No. 3,280,984 (Sexton et al.), U.S. Pat. No. 3,774,377 (Bishop), U.S. Pat. No. 3,789,589 (Delany et al.), U.S. Pat. No. 4,042,358 (Frohmader), U.S. Pat. No. 5,840,094 (Osendorf et al.), U.S. Pat. No. 6,033,453 (Weddell, III) and Japanese Unexamined patent Publication Hei 11-351657 published Dec. 24, 1999, provide illustrative examples of this approach. Also, U.S. patent application Ser. No. 10/172,575 filed Jun. 14, 2002, describes a filter assembly including a reusable frame and a filter element including a collapsible replaceable sheet of pleated filter media that can be collapsed for compact shipping, storage, and disposal, but which can be quickly and easily expanded and installed in the frame.

The sheet of filter media used in such filter assemblies is often graduated density media which increases in density from a portion of the media that defines its air inlet surface and stops larger particulates in the air, toward portions of more closed media which collect smaller particulates than are collected at the air inlet surface. It is important for maximum efficiency of such filter media that it is positioned in the filter assembly so that air will flow into the filter media through its air inlet surface.

SUMMARY OF THE INVENTION

The present invention provides a filter assembly generally of the type described in U.S. patent application Ser. No. 10/172,575 which is further improved to help insure that the filter media is properly placed in the frame so that air will flow through the filter media in the proper direction.

According to the present invention there is provided a filter assembly that, like the filter assembly described in U.S. patent application Ser. No. 10/172,575, includes a stiff frame having front and rear major surfaces, comprising a perimeter portion having opposite first and second end parts, and having a through passageway between its front and rear surfaces surrounded by its perimeter portion. The filter assembly also includes a filter element comprising a sheet of flexible filter media having opposite major inlet and outlet side surfaces, opposite ends, and opposite generally parallel edges extending between its opposite ends, with end portions at each of its ends extending at about a right angle with respect to its opposite edges and structures along those end portions defining spaced first and second openings. The frame includes structure for receiving and positioning the filter element with the sheet of filter media extending across the passageway with the inlet surface of the sheet facing the same direction as the front surface of the frame and with the end portions of the sheet of filter medial extending along the opposite end parts of the frame. That structure of the frame includes first and second generally parallel spaced linear abutments extending along the perimeter portion between its end parts and laying along the opposite edges of the sheet of filter material, and spaced first and second projections on each of the end parts of the frame engaged in the first and second openings at a different one of the ends of the sheet of filter media. The first projection at the first end part is spaced the same first distance from the first abutment in a direction normal to the abutments as the first projection at the second end part is spaced from the second abutment in a direction normal to the abutments; and the second projection at the first end part is spaced the same second distance from the second abutment in a direction normal to the abutments as the second projection at the second end is spaced from the first abutment in a direction normal to the abutments.

Unlike the filter assembly described in U.S. patent application Ser. No. 10/172,575, in the filter assembly according to the present invention the first and second distances are different so that, while the filter element can be mounted on the frame with the structure at either of the ends of the sheet of filter media engaged with the projections at either of the end parts of the frame, the filter element can only be mounted on the frame with the inlet surface of the sheet facing the same direction as the front surface of the frame. This restricts the possibility that a user will place the filter media in the frame with its inlet surface facing away from the direction that air is to flow through the frame, and thereby helps to insure that the full filtering potential of the filter media will be realized.

BRIEF DESCRIPTION OF THE DRAWINGS

The present invention will be further described with reference to the accompanying drawings wherein like reference numerals refer to like or corresponding parts throughout the several views, wherein.

DETAILED DESCRIPTION

Referring now to the drawing, there is shown a filter assembly 10 according to the present invention. The filter assembly 10 includes a frame 11 of a stiff polymeric material having front and rear major surfaces 12 and 13. The frame 11 comprises a perimeter portion 14 having opposite first and second end parts 15 and 16 joined by opposite spaced side parts 18, and has a plurality of through passageways 17 between its front and rear surfaces 12 and 13 surrounded by its perimeter portion 14. The filter assembly 10 also includes a filter element 20 comprising a sheet 21 of flexible filter media having opposite major air inlet and outlet side surfaces 22 and 23, opposite ends 24 and 25, and opposite generally parallel first and second edges 26 and 27 that extend between its opposite ends 24 and 25. The sheet of filter media has end portions at its opposite ends 24 and 25 that extend at about a right angle to its opposite edges 26 and 27. To each of those end portions is attached an elongate attachment strip 28 that provides with those end portions structure having first and second through openings 34 and 35. The frame 11 includes structure for receiving and positioning the filter element 20 with the sheet 21 of filter media extending across the passageways 17, with the inlet surface 22 of the sheet 21 facing the same direction as the front surface 12 of the frame 11 and the outlet surface 23 of the sheet 21 facing the same directions as the rear surface 13 of the frame 11, and with the attachment strips 28 on the end portions of the sheet 21 of filter media extending along the opposite end parts 15 and 16 of the perimeter portion 14 of the frame 11. That structure on the frame 11 comprises first and second generally parallel spaced linear abutments 30 and 31 extending along the side parts 18 of the perimeter portion 14 between its end parts 15 and 16 and laying along the opposite edges 26 and 27 of the sheet 21 of filter material when the filter element 20 is in the frame 11, and spaced first and second projections 32 and 33 on each of the end parts 15 and 16 of the frame 11 that engage in the first and second openings 34 and 35 through different ones of the end portions and attachment strips 28 of the filter element 20 when the filter element 20 is in the frame 11. The first projection 32 at the first end part 15 is spaced the same first distance X from the first abutment 30 in a direction normal to the abutments 30 and 31 as the first projection 32 at the second end part 16 is spaced from the second abutment 31 in a direction normal to the abutments 30 and 31; and the second projection 33 at the first end part 15 is spaced the same second distance Y from the second abutment 31 in a direction normal to the abutments 30 and 31 as the second projection 33 at the second end part 16 is spaced from the first abutment 30 in a direction normal to the abutments 30 and 31. In the filter assembly 10 according to the present invention the first and second distances X and Y are different so that the patterns of the projections 32 and 33 and of the openings 34 and 35 are asymmetric. While the filter element 20 can be mounted on the frame 11 with either of the attachment strips 28 on the end portions of the sheet 21 of filter media engaged with the projections 32 and 33 (i.e., with the projections 32 and 33 in the opening 34 and 35 in the end portions and the attachment strips 28) at either of the end parts 15 or 16; the filter element 20 can only be mounted on the frame 11 with the inlet surface 22 of the sheet 21 adjacent or facing the same direction as the front surface 12 of the frame 11 and the outlet surface 23 of the sheet 21 adjacent or facing the same direction as the rear surface 13 of the frame 11. There are no openings in the attachment strips 28 that will receive the projections 32 and 33 when the inlet surface 22 of the sheet 21 of filter media faces the same direction as the rear surface 13 of the frame 11. This restricts the possibility that a user will place the sheet 21 of filter media in the frame 11 with its inlet surface 22 facing away from the direction that air is to flow through the frame 11, and helps to insure that the full filtering potential of the sheet 21 of filter media will be realized.

The first opening 34 in the end portion of the sheet 21 of filter media and the attachment strip 28 attached thereto at the first end 24 of the sheet 21 is spaced the same first distance X' from the first edge 26 of that sheet in a direction normal to its edges 26 and 27 as the first opening 34 in the end portion of the sheet 21 of filter media and the attachment strip 28 attached thereto at the second end 25 of the sheet 21 is spaced from the second edge 27 of that sheet 21 in a direction normal to its edges 26 and 27; and the second opening 35 in the end portion of the sheet 21 of filter media and the attachment strip 28 attached thereto at the first end 24 of the sheet 21 is spaced the same second distance Y' from the second edge 27 of that sheet 21 in a direction normal to its edges 26 and 27 as the second opening 35 in the end portion of the sheet 21 of filter media and the attachment strip 28 attached thereto at the second end 25 of the sheet 21 is spaced from the first edge 26 of that sheet 21 in a direction normal to its edges 26 and 27. Those first and second distances X' and Y' are each generally the same as the corresponding X and Y distances described above with respect to the projections 32 and 33 (sometimes slightly less to facilitate installation of the filter element 20 in the frame 11), and those first and second distances X' and Y' are different so that, as noted above, the pattern of the openings 34 and 35 is asymmetric. While filter element 20 can be mounted on the frame 11 with either of the attachment strips 28 on the end portions of the sheet 21 of filter media engaged with the projections 32 and 33 (i.e., with the projections 32 and 33 in the opening 34 and 35 in the end portions and the attachment strips 28) at either of the end parts 15 or 16; the filter element 20 can only be mounted on the frame 11 with the inlet surface 22 of the sheet 21 adjacent or facing the same direction as the front surface 12 of the frame 11 and the outlet surface 23 of the sheet 21 adjacent or facing the same direction as the rear surface 13 of the frame 11.

In the embodiment of the filter assembly 10 illustrated in FIGS. 1 through 5 the reusable filter frame 11 includes a base portion 36 and a cover portion 38 mounted on the base portion 36 to afford relative movement of the base and cover portions 36 and 38 between an open position (FIG. 1) at which the portions 36 and 38 are sufficiently spaced apart to allow the filter element 20 to be inserted into or removed from the frame 11, and a closed position (FIG. 4) at which the portions 36 and 38 position and hold the filter element 20 between them at a predetermined position on the frame 11. The base and cover portions 36 and 38 both include and provide parts of the perimeter portion 14 of the frame 11. The closed filter frame 11 is generally a parallepiped with rectangular side surfaces sized and intended to be positioned in a receptacle positioned transverse of an air duct of a residential air handling system, such as a furnace to filter air passing through that air duct.

The filter element 20 has an appropriate size and configuration to removeably fit into the base portion 36 of the frame 11. The sheet 21 of filter media in the filter element 20 (described more fully below) has a plurality of pleats 40 and can optionally include a flexible non-stretchable spacing structure 42 having through openings attached to and extending between successive pleat tips 43 along the inlet surface 22 of the sheet 21. That spacing structure 42 limits the distance that the ends 24 and 25 of the sheet 21 may be spaced from each other to expand the filter element 20 and, when the filter element is fully expanded, establishes uniform spacing between the pleat tips 43. A suitable material for use as the spacing structure 42 is a reinforcing fabric available from Bayex Inc., Albion, N.Y. under the product number DPM 4410 P3A-2-24. This product is an open scrim having four strands per inch of 70 denier polyester thread. The scrim is provided with an adhesive that allows the scrim to be applied directly to the sheet 21 of filter media.

A plurality of equally spaced generally parallel transverse ribs 50 of equal height extend between the side parts 18 of the perimeter portion 14 on the base portion 36 of the frame 11 and define spaced elongate sockets that receive the pleats 40 between successive pleat tips 43 while the ribs engage and support the sheet 21 of filter media along its outlet surface 23 at the pleat tips 43. A plurality of (three as illustrated) longitudinal rails 51 extend between the end parts 15 and 16 of the perimeter portion 14 on the base portion 36 of the frame 11 and are attached to the transverse ribs 50 to form a grid structure. A continuous potion 52 of each rail 51 (FIG. 2) extends between the end parts 15 and 16 on the side of the pleated sheet 21 of filter media opposite its inlet surface 22. Each rail 51 also includes a plurality of adjacent triangular shaped spacer portions 53 that each extend from that continuous portion 52 to a different one of the ribs 50. The surfaces 54 of the spacer portions 53 between successive ribs 50 can contact and space the pleats 40 centrally between the ribs 50. The ribs 50 and rails 51 could be formed as separate members of any suitable materials, but preferably are molded as a unitary structure together with the base portion 36 of a synthetic plastic material such as ABS (acrylonitrile butadiene styrene) or HIPS (high impact polystyrene). Such molding is facilitated by providing small discontinuities in each rib 50 at its intersection with the rails 51 and with the abutments 30 and 31 with recessed surfaces in those discontinuities at which ejection pins in the mold can push the base portion 36 from the mold.

The cover portion 38 (which can be molded of the same material as the base portion 36) has a plurality of (e.g., 8) through openings 55 providing parts of the passageways 17 that allow air to flow through the frame 11 and the filter element 20 so that contaminants can be removed from the air stream. The cover portion 38 inter-engages the periphery of the base portion 36 in the closed position of the portions 36 and 38 to securely retain the filter element 20 in the frame 11 and to prevent air from flowing around the filter element 20. The base portion 36 and cover portion 38 are pivotally connected along corresponding sides by hinge members 57 (FIG. 1) including projecting parallel stiff flexible plate-like members with openings through their distal ends on the cover portion 38 that are received in slots in the base portion 36 with pins on the base portion projecting into those openings. Thus the base and cover portions 36 and 38 are relatively movable between their open position (FIG. 1) at which their edges opposite the hinge members 57 are spaced sufficiently spaced apart to allow the filter element 20 to be installed in or removed from the frame 11, and a closed position (FIG. 4) at which the base and cover portions 36 and 38 are engaged to enclose the filter element 20 in the frame 11. In this closed position openings 58 through the cover portion 38 closely receive the distal end portions of the projections 32 and 33 so that the closed cover portion 38 restricts displacement of the attachment strips 28 and end portions of the sheet 21 of filter media from the projections 32 and 33. Alternatively, other conventional hinges could also be used, or the base and cover portions 36 and 38 of the frame 11 could be integrally molded and joined by a thin polymeric strip of the type called a living hinge along corresponding sides, or the base and cover portions 36 and 38 could be totally separable and could be held together in their closed position by latch members along opposite sides.

Latches are provided for releasably maintaining the cover and base portions 36 and 38 of the frame 11 in their closed position. Each latch includes a latch member 59 (FIG. 4) mounted on a rail 60 formed on the base portion 36 for sliding movement between an open position (FIG. 1) at which the latch member 59 is spaced from an elongate lug 61 on the cover portion 38 to permit movement of the cover and base portions 36 and 38 between their open and closed positions, and a closed position at which the latch member 59 can receive the lug 61 in a channel in the latch member 59 (FIG. 4) when the portions 36 and 38 of the frame 11 are in their closed position to releasably retain the portions 36 and 28 of the frame 11 in their closed position. Alternatively other conventional closures or mechanical fasteners could be used for that purpose.

The cover portion 38 includes a longitudinal support bar 62 opposite the central one of the three rails 51 in the base portion 36 together with decorative arcuate transverse support bars 63 to further retain the filter media 10 in the frame 11. Those support bars 62 and 63 restrict the filter media 10 from ballooning out of the frame 11, particularly in case the filter assembly frame is inadvertently inserted in an air duct with the cover portion 38 facing downstream with respect to air flow in the duct.

To help insure that the filter assembly 10 is correctly installed in an air duct with the inlet surface 22 of the sheet 21 of filter media and the cover portion 38 upstream, a visual indicator 64 including words and an arrow is provided on the frame 11 to show the proper orientation of the filter assembly 10 relative to the direction of the air flow. Additional instructions or indicators can also be provided to insure the frame is properly arranged in the air duct.

The filter assembly 10 can be used, for example, in air ducts associated with a furnace and/or air conditioning system. Accordingly, the frame 11 generally has a depth or thickness between its surfaces 12 and 13 of ½ inch to 5 inches, preferably between ¾ inch to 1¼ inches, and more preferably approximately 1 inch thick. The height of the frame 11 is generally between 5 inches and 24 inches, and preferably between 16 inches and 20 inches. The width of the frame is generally between 18 inches and 40 inches, and preferably between 20 inches and 30 inches.

To facilitate removal of the filter assembly 10 from a receptacle across an air duct, two recesses 65 are provided along each side and end of the frame 11. A user can insert the ends of his or her fingers into those recesses 65, engage those finger ends behind tab portions 66 of the frame 11 that define parts of the recesses 65, and pull on the frame 11 to remove the filter assembly 10 from the receptacle in the air duct.

Figure 4:
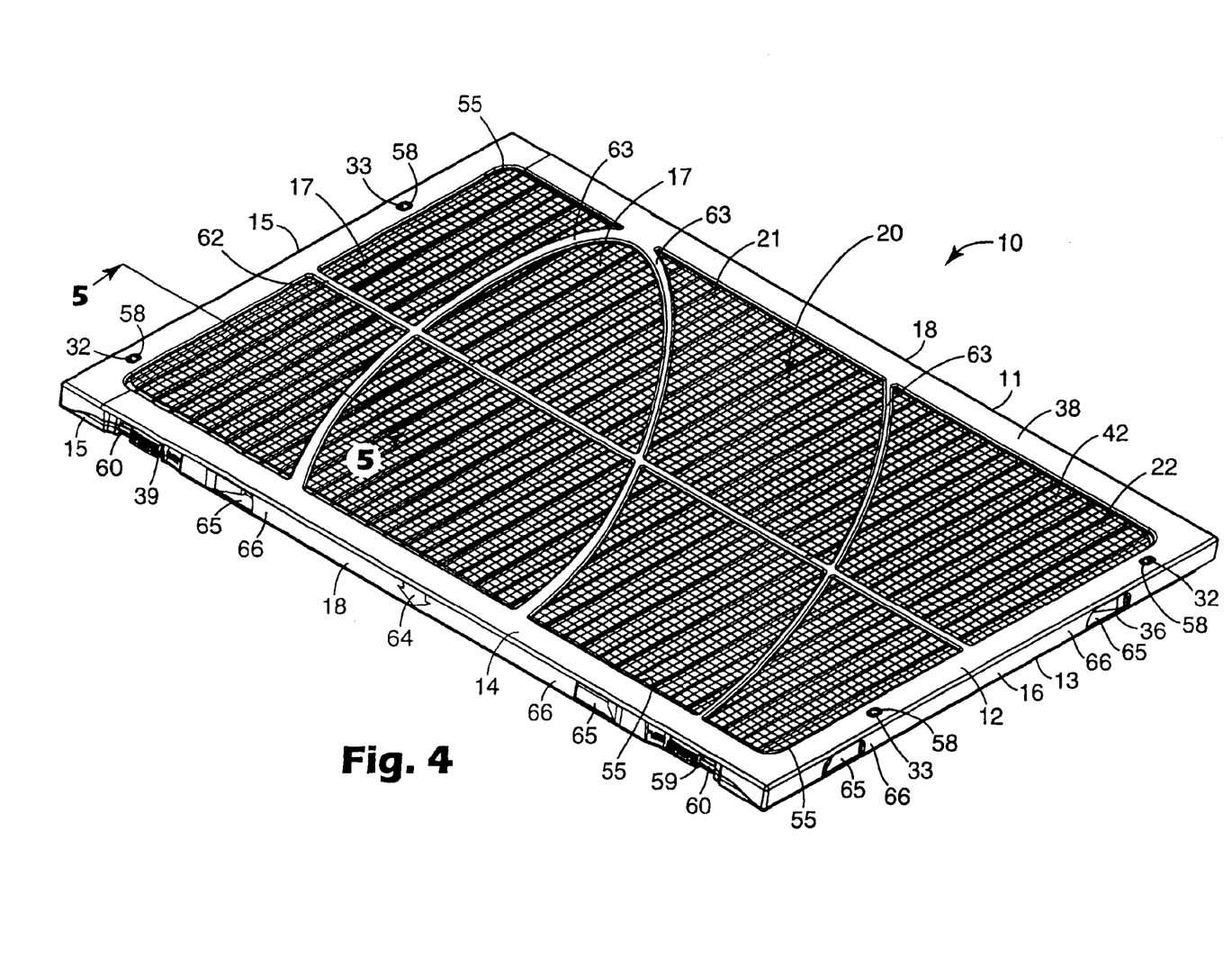
FIG. 4 is a perspective view of the filter assembly of FIG. 1 showing the base and cover portions of the frame closed with the filter element of FIG. 1 between them.
Figure 5:
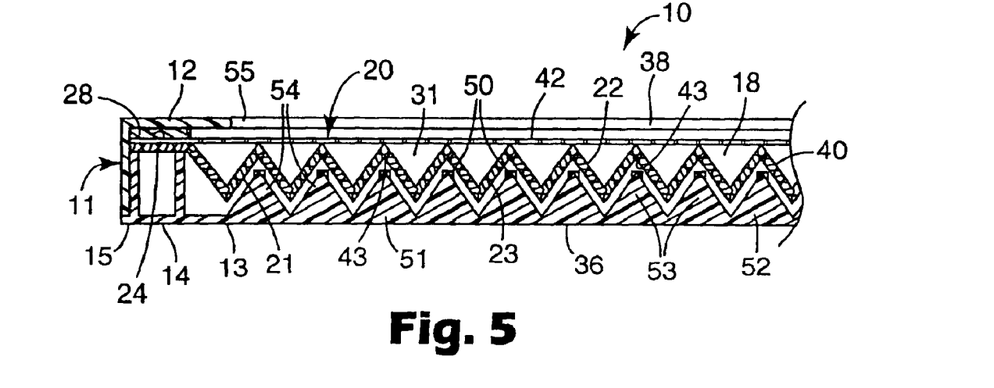
FIG. 5 is an enlarged sectional view taken approximately along line 5—5 of FIG. 4.
Figures 6, 7, 8:
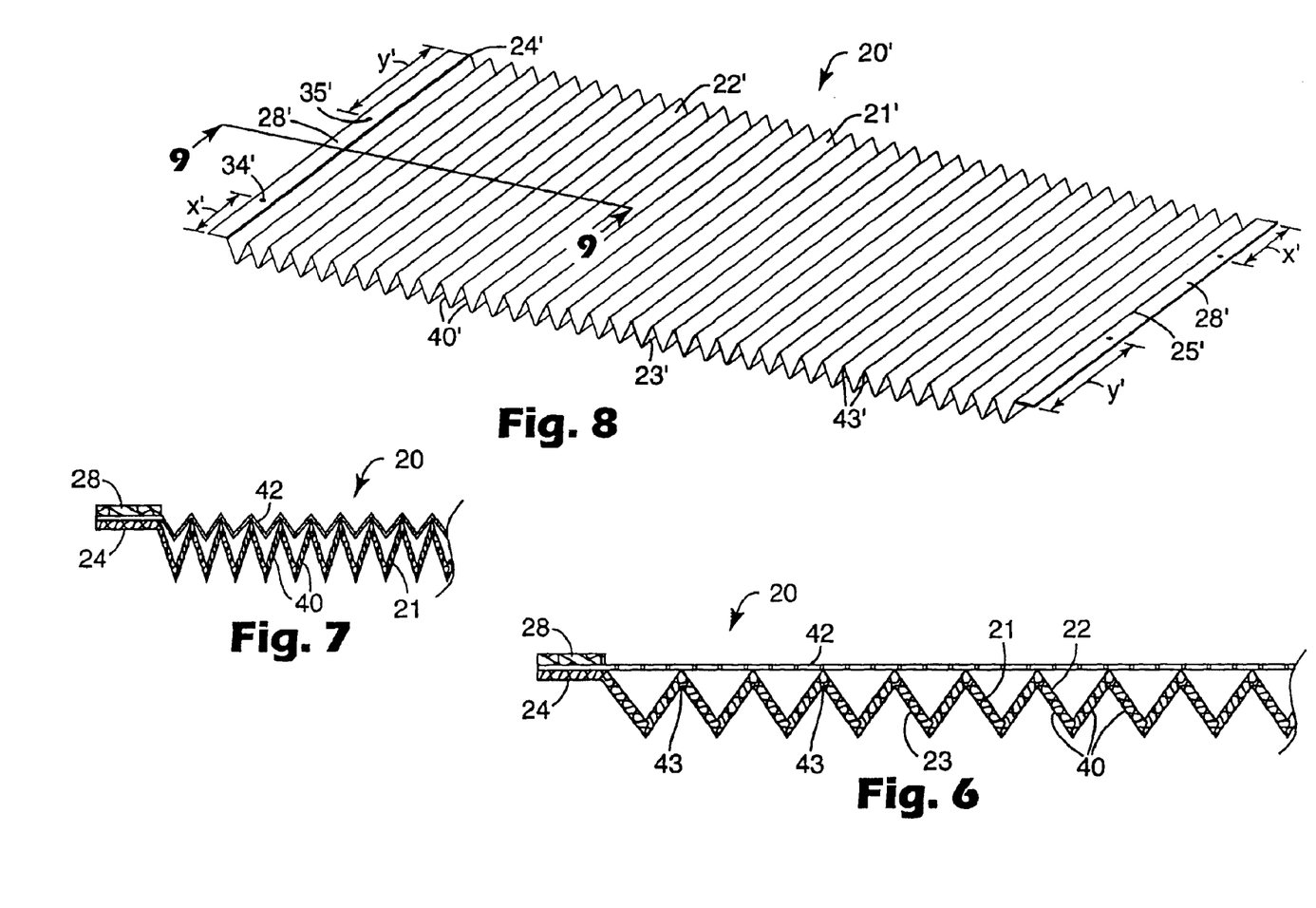
FIG. 6 is an enlarged fragmentary sectional view taken approximately along line 6—6 of FIG. 1 with the filter element in a fully extended condition.
FIG. 7 is an enlarged fragmentary sectional view taken approximately along line 6—6 of FIG. 1 with the filter element in a more collapsed condition.
FIG. 8 is a perspective view of a second embodiment of a replaceable filter element according to the present invention that can be used in the frame shown in FIG. 1.

FIGS. 6 through 7 show details of the accordion pleated replaceable filter element 20 that can be collapsed to a convenient compact form or condition for shipping and storage (the filter element 20 is shown in a partially collapsed in FIG. 1, and in a more fully collapsed condition in FIG. 7) and can be re-expanded (as shown in FIGS. 4 and 6) for insertion into the base portion 36 of the frame 11. Details concerning the filter element 20 in addition to those provided herein are provided in U.S. patent application Ser. No. 10/172,575 filed Jun. 14, 2002, the content whereof is incorporated herein by reference.

The elongate attachment strips 28 along the end portions of the sheet 21 of filter media at its opposite ends 25 and 26 extend at right angles to the edges 26 and 27 of the sheet 21 of filter medial and are parallel to the fold lines 60. The attachment strips 28 can have a stiffness greater than the stiffness of the sheet 21 of filter media, thereby provided stiff ends of the filter element 20 that are easily handled and facilitate expanding the filter element 20. Also, the attachment strips 28 provide the ends 25 and 26 with increased strength and rigidity so that the filter element 20 can be quickly and easily inserted into the base portion 36 and pressed over the projections 32 and 33 that are received in the openings 34 and 35 in the attachment strips 28. The attachment strips 28 may be formed of any suitable material including metal foils, paperboard, cardboard, chipboard, synthetic plastic materials including plastic film, or multiple layers of the filter media laminated together. Sheets of some types of filter media may not need the attachment strips 28, but instead engage the projections 32 and 33 only with the end portions of the sheet that provide structure along those end portions in which the projection receiving openings 34 and 35 are formed.

The generally cylindrical projections 32 and 33 can have a plurality of (e.g., 4) equally circumferentially spaced radially projecting axially extending ribs 67 (FIG. 2) that will press into the structures along the end portions of the sheet 21 of filter media (e.g., the attachment strips 28) when they are pressed over the projections 32 and 33 to help retain those structures around the projections 32 and 33.

While the sheet 21 of filter media may be of any filter media, it is preferred that the filter media is electro statically charged. The media can either be relatively stiff and self-supporting or relatively soft and non self-supporting. By "self-supporting" we mean that the sheet 21 of filter media, with or without a spacing structure, generally maintains its shape when subjected to an air stream. Generally, a stiff self-supporting media has a Gurley stiffness of greater than 50 milligrams for a sample size having a width of 2 inches and a length of 1.5 inches and preferably has a Gurley stiffness of greater than 100 milligrams for that sample size; and a soft non self-supporting media has a Gurley stiffness of less than 30 milligrams for that sample size. For media having stiffness values between these values, whether or not the media is self-supporting depends on the construction of the media, the shape of the sheet of filter media and on its use.

If the media is self-supporting, the support ribs 50 may not be required because the sheet 21 of filter media will maintain its shape when subjected to the air stream. On the other hand, if the media is non self-supporting, the support ribs 50 are needed to support the sheet 21 of filter media when the filter element 20 is placed in an air stream to prevent the pleats 40 from bowing or collapsing.

As an example, the sheet 21 could be made of the generally self-supporting filter media commercially identified as "ACCUAIR" 2.0 ounce per square yard filter media that is available from Kimberly Clark Corporation, Neenah, Wis. and has a Gurley stiffness of approximately 120 milligrams for a sample size having a width of 2 inches and a length of 1.5 inches. Also, the sheet 21 could be made of the non self-supporting filter media commercially identified as "FILTRETE"(™) GCB 35 that is available from 3M Company, St. Paul, Minn. and has a Gurley stiffness of approximately 15 milligrams for that sample size. That "FILTRETE"(™) filter media is a graduated density media in that it increases in density from a portion of the media that defines its air inlet surface and stops larger particulates in the air, toward portions of more closed media which collect smaller particulates than are collected at the air inlet surface. That "FILTRETE"(™) filter media also includes a reinforcing layer of a strong open scrim along its air outlet surface such as the reinforcing scrim commercially identified as "CLAF" that is available from Amoco Nisseki CLAF, Austell, Ga. Further details concerning that "FILTRETE" (™) filter medial are provided in U.S. Pat. No. 5,792,242 (Haskett), the content whereof is incorporated by reference herein. It is important for maximum efficiency of such graduated density filter media that the sheet 20 of filter media is positioned in the filter assembly 10 so that air will flow into the sheet 21 of filter media through its air inlet surface 22 and out of the sheet 21 of filter media through its opposite air outlet surface 23.

Figure 9:
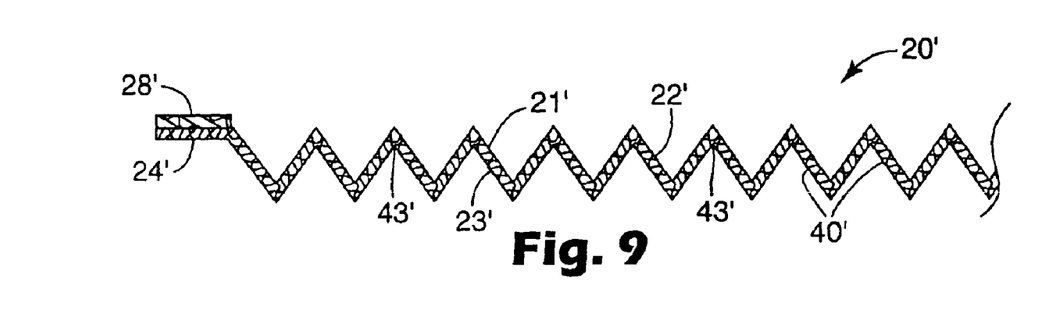
FIG. 9 is an enlarged fragmentary sectional view taken approximately along line 9—9 of FIG. 8.

While the filter element 20 may be more easily handled and inserted into the base portion 36 of the frame 11 when the filter element 20 includes the spacing structure 42, a filter element 20' such as that illustrated in FIG. 9 without the spacing structure 42 but with otherwise the same structure as the filter element 20 can be just as effective in filtering air with a sheet 21' of the same filtering media when used in the frame 11. Inserting such a filter element 20' into the base portion 36 of the frame 11 will require care to insure that its pleats 40' drop into the sockets between the support ribs 50 and that the pleat tips 43' are supported on the support ribs 50. Also, without the spacing structure 42 it would be quite easy to insert the filter element 20 in the base portion 36 upside down, however the spaced openings 34' and 35' in the attachment strips 28' will only receive the first and second projections 32 and 33 on the base portion 36 when the inlet surface 22' of the sheet 21' is facing the same direction as the front surface 12 of the frame 11 (as is intended) to insure that the filter element 20 is properly inserted in the base portion 36 so that the full filtering potential of the sheet 21' of filter media will be realized.

Figure 10:
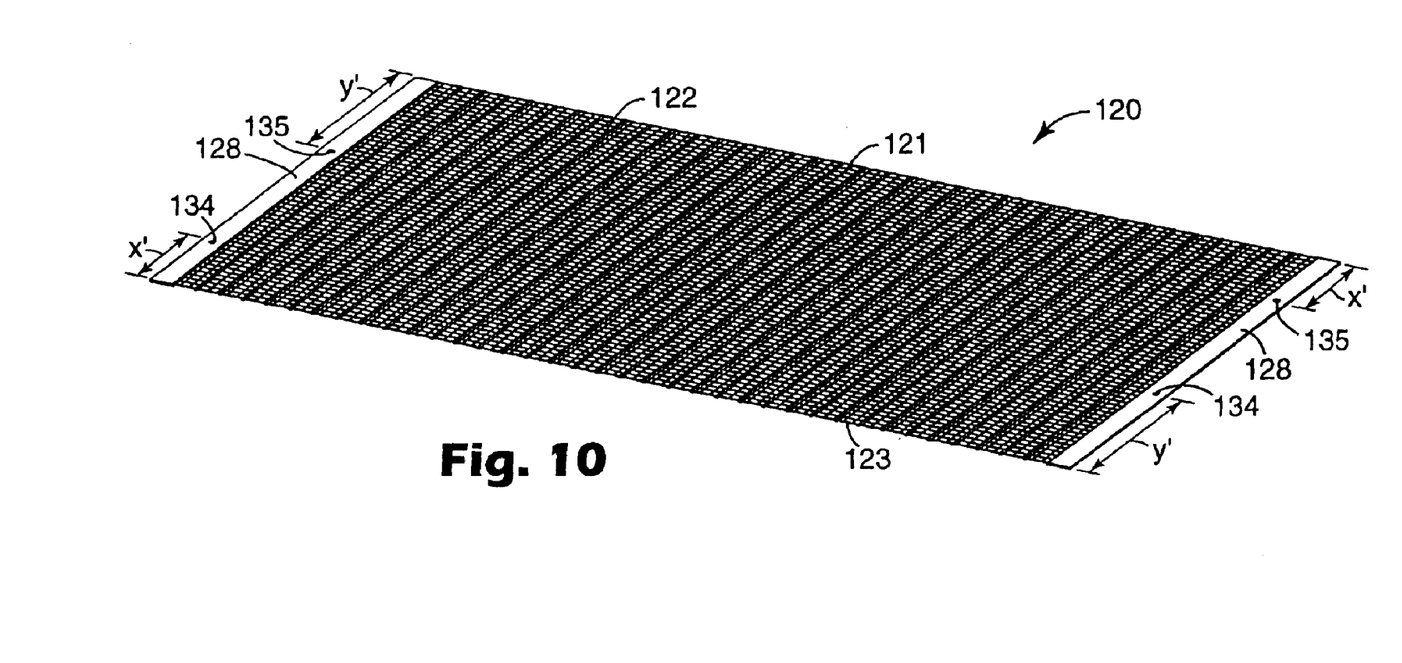
FIG. 10 is a perspective view of a third embodiment of a replaceable filter element according to the present invention that can be used in the frame shown in FIG. 1.

Also, a filter element 120 such as that illustrated in FIG. 10 that, with a sheet 121 of the same filter media should have less capacity to filter air and would provide more air flow resistance, but which is less expensive, can also be used in the frame 11. That filter element 120 has the same structure as the filter element 20' except that the sheet 121 of filter media is not pleated, but is intended to extend in a plane across the tops of the support ribs 50 on the base portion 36. It would be quite easy to insert the filter element 120 in the base portion 36 upside down, however the spaced openings 134 and 135 in the attachment strips 128 will only receive the first and second projections 32 and 33 on the base portion 36 when the inlet surface 122 of the sheet 121 is facing the same direction as the front surface 12 of the frame 11 (as is intended) to insure that the filter element 120 is properly inserted in the base portion 36 so that the full filtering potential of the sheet 121 of filter media will be realized.

Figure 1:
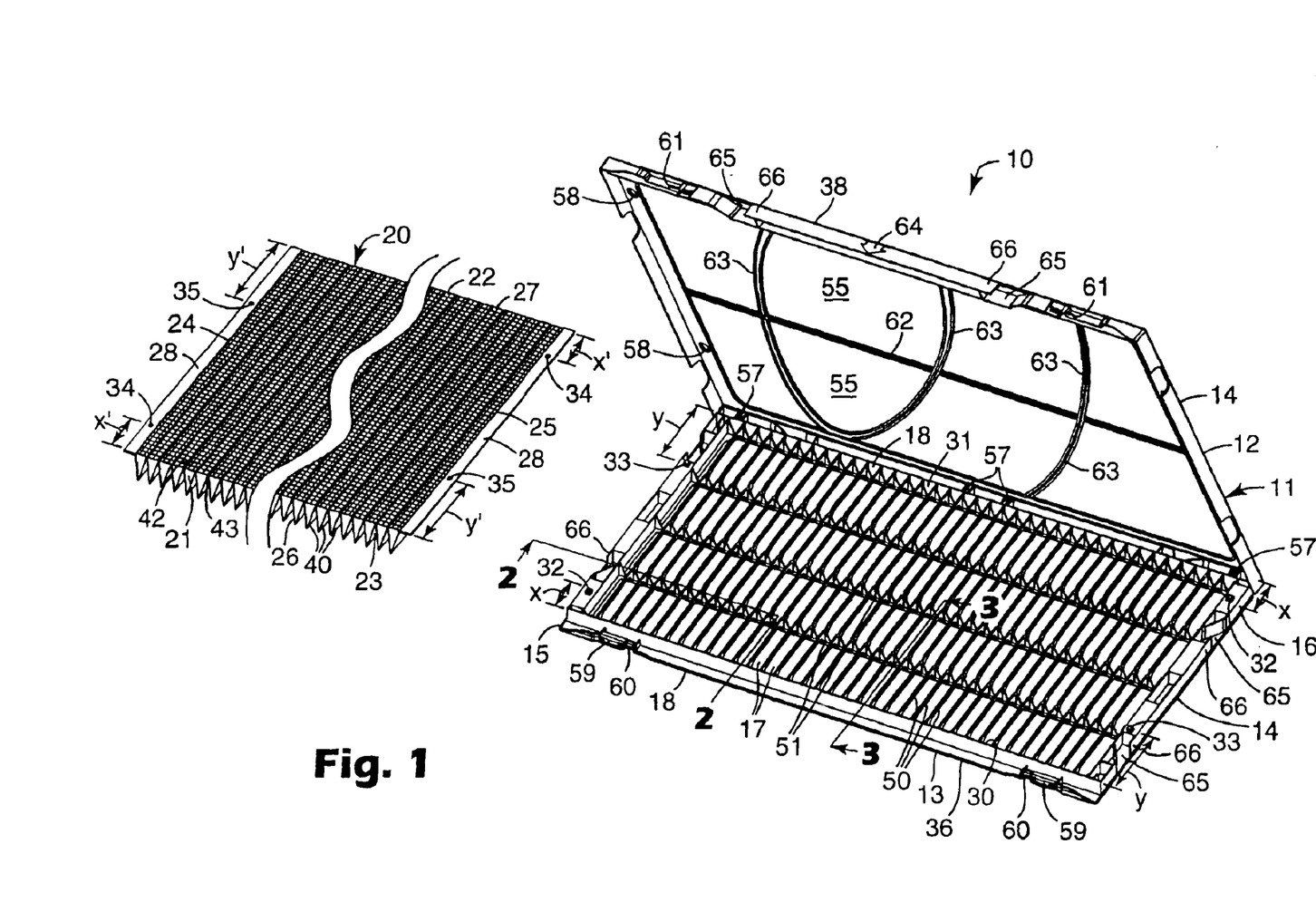
FIG. 1 is a perspective view of a filter assembly according to the present invention including a reusable frame shown with its base and cover portions open, and a first embodiment of a replaceable filter element according to the present invention shown spaced from the open frame, with a fragment removed, and in a slightly collapsed condition.
Figure 2:
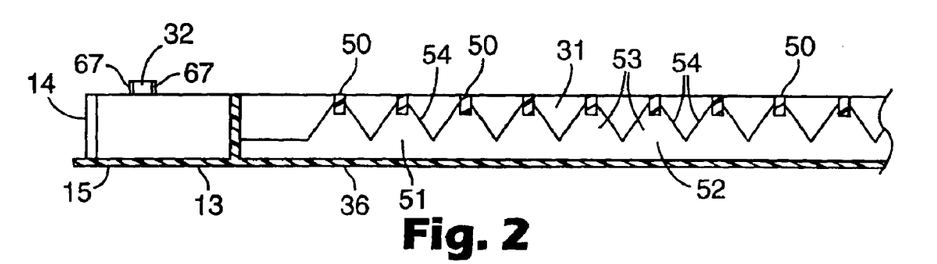
FIG. 2 is an enlarged sectional view taken approximately along line 2—2 of FIG. 1.
Figure 3:
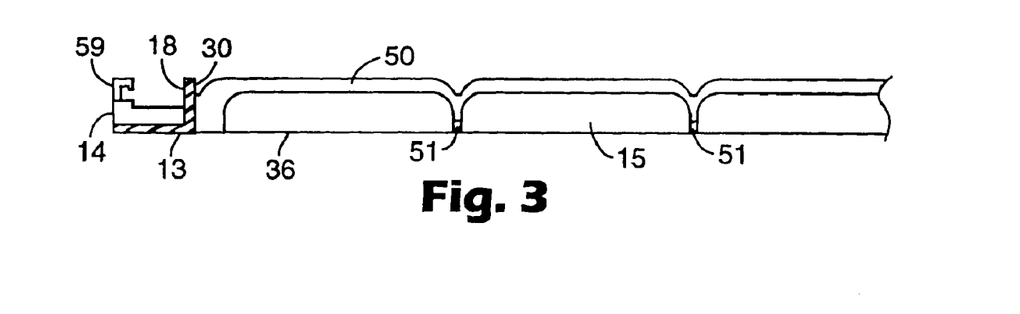
FIG. 3 is an enlarged sectional view taken approximately along line 3—3 of FIG. 1.

To install any of the filter elements 20, 20' or 120 in the frame 11, the frame 11 is placed on a surface so that its base portion 36 is beneath its cover portion 38. After releasing the latches 44 the cover portion 38 of the frame 11 is moved to the open position of the portions 36 and 38 (FIG. 1). The filter element 20, 20' or 120 is then expanded by grasping and separating the attachment strips 28. The pleats 40 or 40' (in the case of filter elements 20 or 20') are dropped into the sockets between the support ribs 50 or the sheet 121 of filter media (in the case of the filter element 120) is dropped onto the support ribs 50, and the attachment strips 28, 28' or 128 are pressed over the first and second projections 32 and 33 that are received in the openings 34 and 35, 34' and 35', or 134 and 135 to insure the installer that the filter element has been properly installed in the frame 11. The cover and base portions 38 and 36 are then moved to their closed position and the latches 44 are re-engaged to retain the filter element 20, 20' or 120 in place.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. For example, the sheet 21 of filter media could be of any suitable filtering material such as a fibrous material, or a sheet of polymeric foam, or a woven netting. The filter element 20 could be made to be disposable after a single use, or could be made of suitable materials (e.g., a woven netting) so that it could be washed and reused. Also, in addition to being adapted for use in air ducts associated with a furnace and/or air conditioning system, the filter assembly 10 could be adapted in size and shape for use in window air conditioner units, kitchen vent systems, and room air cleaning appliances. Thus, the scope of the present invention should not be limited to the structures described in this application, but only by the structures described by the language of the claims and the equivalents of those structures.

What is claimed is:

1. A filter assembly including:
   a stiff frame having front and rear major surfaces, comprising a perimeter portion defining the perimeters of said surfaces and having opposite first and second end parts, said frame having a through passageway between said front and rear surfaces surrounded by said perimeter portion;
   a filter element comprising a sheet of flexible filter media having opposite major inlet and outlet side surfaces, opposite ends, and opposite generally parallel edges extending between said opposite ends, an end portion of said sheet at each of said ends extends at about a right angle to said opposite edges and has structure defining spaced first and second through openings; and
   structure on said frame for receiving and positioning said filter element with said sheet of filter media extending across said passageway with said inlet surface of said sheet facing the same direction as said front surface of said frame and with said end portions of said filter element extending along said opposite end parts of said perimeter portion, said structure on said frame including first and second generally parallel spaced linear abutments extending along said perimeter portion between said end parts and laying along said opposite edges of said sheet of filter material, and spaced first and second projections on each of said end parts of said frame engaged in the first and second openings at a different one of the ends of said sheet of filter material;
   said first projection at said first end part being spaced the same first distance from said first linear abutment in a direction normal to said abutments as said first projection at said second end part is spaced from said second linear abutment in a direction normal to said abutments, and said second projection at said first end part being spaced the same second distance from said second linear abutment in a direction normal to said abutments as said second projection at said second end is spaced from said first linear abutment in a direction normal to said abutments; and said first and second distances being different so that said filter element can be mounted on said frame with the structure at either of the ends of the sheet of filter material engaged with the projections at either of the end parts of the frame while the filter element can only be mounted on the frame with said inlet surface of said sheet facing the same direction as said front surface of said frame.

2. A filter assembly according to claim 1, wherein said frame comprises a base portion providing said structure on the frame for receiving and positioning said filter element, and a cover portion adapted to be moved relative to said base portion between an open position spaced from said structure for receiving and positioning said sheet of filter media to afford positioning said sheet of filter media on or removing said sheet of filter medial from said structure for receiving and positioning said sheet of filter media, and a closed position retaining said filter element on said structure for receiving and positioning said sheet of filter media.

3. A filter assembly according to claim 2, wherein said base and cover portions include corresponding opposite first and second side edges, a hinge connects said second edges and affords relative movement of said base and cover between said closed position at which said first side edges are closely adjacent and an open position wherein said first side edges are spaced apart to allow the filter element to be inserted into or removed from the frame, and said filter assembly includes a latch for releasably attaching said base and cover portions in said closed position.

4. A filter assembly according to claim 1, wherein said filter element includes two elongate attachment strips with each attachment strip attached along a different one of said end portions of said sheet of filter media, said attachment strips providing at least a portion of said structure defining said spaced first and second openings.

5. A filter assembly according to claim 1, wherein said sheet of filter media in said filter element provides said structure defining said spaced first and second openings.

6. A filter assembly according to claim 1, wherein said base portion includes a plurality of generally parallel equally spaced ribs extending at right angles to said linear abutments, said filter media has a plurality of pleats, each pleat including a fold line defining a pleat tip and a pair of adjacent panels, said adjacent panels being received between said ribs and said pleats being supported on said ribs at said pleat tips.

7. A filter assembly according to claim 6, wherein said filter element includes a flexible spacing structure between said pleat tips to space said pleat tips at maximum distances generally corresponding to the spacing between said ribs, said spacing structure having openings that allow air to readily flow through said spacing structure.

8. A filter assembly according to claim 6, wherein said sheet of filter media has a Gurley stiffness of less than 100 milligrams.

9. A filter assembly according to claim 1, wherein said projections are generally cylindrical and each have a plurality of equally spaced radially projecting axially extending ribs that will press into the structures along the end portions of the sheet of filter media when they are pressed over the projections to help retain said structures around the projections.

10. A filter element for use in a reusable frame to form a filter assembly, said filter element comprising a sheet of flexible filter media having opposite major inlet and outlet side surfaces, opposite ends, and opposite generally parallel edges extending between said opposite ends, an end portion of said sheet at each of said ends extends at about a right angle to said opposite edges and has structure defining spaced first and second openings;

the first opening at the first end of the sheet being spaced the same first distance from the first edge of said sheet in a direction normal to said edges as the first opening at the second end of the sheet is spaced from the second edge of said sheet in a direction normal to said edges, and the second opening at the first end of the sheet being spaced the same second distance from the second edge of said sheet in a direction normal to said edges as the second opening at the second end of the sheet is spaced from the first edge of said sheet in a direction normal to said edges, said first and second distances being different so that the filter element can be mounted on a frame with said structure at either of the ends of the sheet of filter media engaged with projections at corresponding positions on a frame with the projections in the openings at either of two opposite the end parts of the frame, while the filter element can only be mounted on the frame with the inlet surface of the sheet facing the same direction as a front surface of the frame.

11. A filter element according to claim 10, wherein said filter element includes two elongate attachment strips with each attachment strip attached along a different one of said end portions of said sheet of filter media, said attachment strips providing at least a portion of said structure defining said spaced first and second openings.

12. A filter element according to claim 10, wherein said sheet of filter media in said filter element provides said structure defining said spaced first and second openings.

13. A filter element according to claim 10, wherein said sheet of filter media has a plurality of pleats, each pleat including a fold line defining a pleat tip and a pair of adjacent panels.

14. A filter element according to claim 10, wherein said filter element includes a flexible spacing structure between said pleat tips that can space said pleat tips at maximum distances.

15. A filter element according to claim 10, wherein said filter media has a Gurley stiffness of less than 100 milligrams.

16. A filter element according to claim 10, wherein said sheet of filter media is planar.

* * * * *

UNITED STATES PATENT AND TRADEMARK OFFICE
CERTIFICATE OF CORRECTION

PATENT NO. : 6,843,820 B2
DATED : January 18, 2005
INVENTOR(S) : Kubokawa, James O.

It is certified that error appears in the above-identified patent and that said Letters Patent is hereby corrected as shown below:

Column 4,
Line 63, delete "parallepiped" and insert -- parallel piped --.

Column 5,
Line 2, delete "removeably" and insert -- removably --.

Column 11,
Line 22, after "opposite" delete "the".

Signed and Sealed this

Twenty-third Day of August, 2005

JON W. DUDAS
*Director of the United States Patent and Trademark Office*